United States Patent Office 2,767,619
Patented Oct. 23, 1956

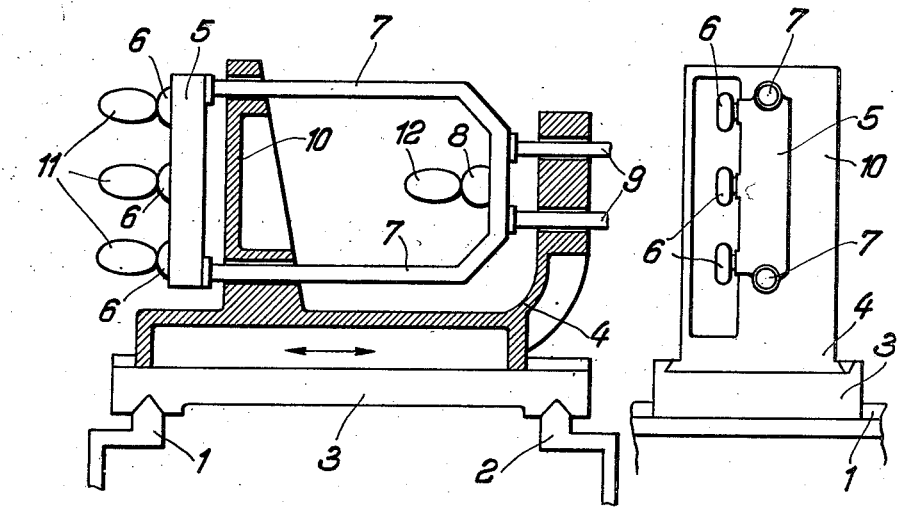
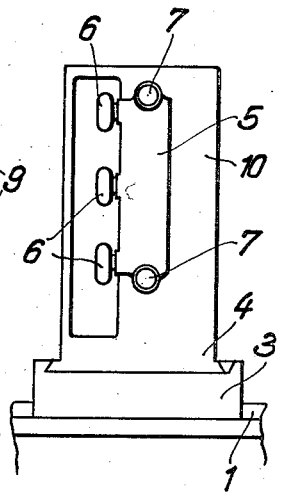
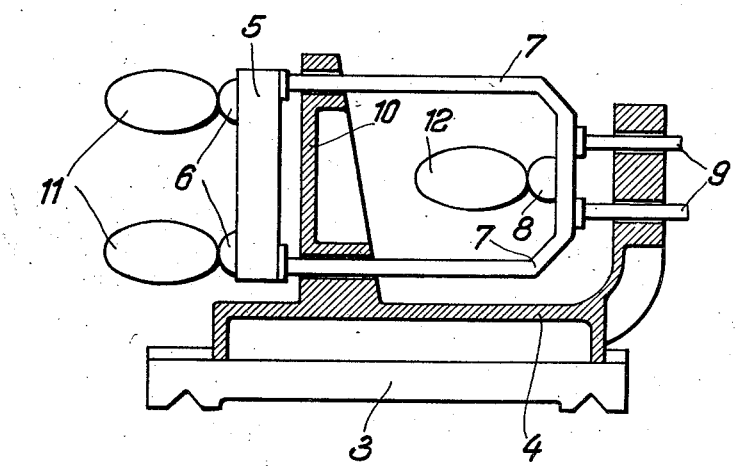

2,767,619

TOOL SUPPORTING MEANS FOR DUPLICATING MACHINES AND THE LIKE

Rolf Geiger, Ludwigshafen (Rhine), Germany

Application August 12, 1953, Serial No. 373,732

Claims priority, application Germany August 26, 1952

5 Claims. (Cl. 90—13.4)

The present invention relates to duplicating machines.

More particularly, the present invention relates to means for supporting the tools of a duplicating machine or the like.

With duplicating machines which are intended to work on articles of substantially different sizes, it is essential that the carrier for the cutting tools be mounted for movement through a stroke which is at least large enough to accommodate cutting of the largest article for which the machine is designed. These tool carriers are of considerable weight and when they are moved through substantial distances their acceleration gives rise to large forces which are very undesirable, and moreover the movement of such heavy tool carriers requires a considerable amount of energy. For these reasons, most duplicating machines have thus far been designed to operate on articles whose size varies within predetermined limits so that separate machines are required to manufacture articles of widely different sizes.

One of the objects of the present invention is to overcome these drawbacks by providing a duplicating machine capable of operating on articles of widely different sizes and at the same time having a relatively light support for the tools.

A further object of the present invention is to provide a means for adjusting the tool carrier so that it need only move through a relatively small distance irrespective of the size of the articles being manufactured.

An additional object of the present invention is to provide an apparatus capable of accomplishing the above objects while at the same time being made of simple, ruggedly constructed parts which are very reliable in operation.

With the above objects in view, the present invention mainly consists of an apparatus for mounting cutting tools of a duplicating machine, this apparatus including a support frame and a first carriage mounted on the support frame for reciprocating movement in a first direction. A second carriage is mounted on the first carriage for shiftable and adjustable movement in a second direction perpendicular to the first direction, and a tool carrying means is mounted on the second carriage for movement in a third direction parallel to the second direction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a fragmentary, partly sectional diagrammatic transverse view of an apparatus constructed in accordance to the present invention;

Fig. 2 is a front view of the apparatus of Fig. 1; and

Fig. 3 shows the apparatus of Fig. 1 adjusted to operate on work pieces of a larger size than those of Fig. 1.

Figure 4:
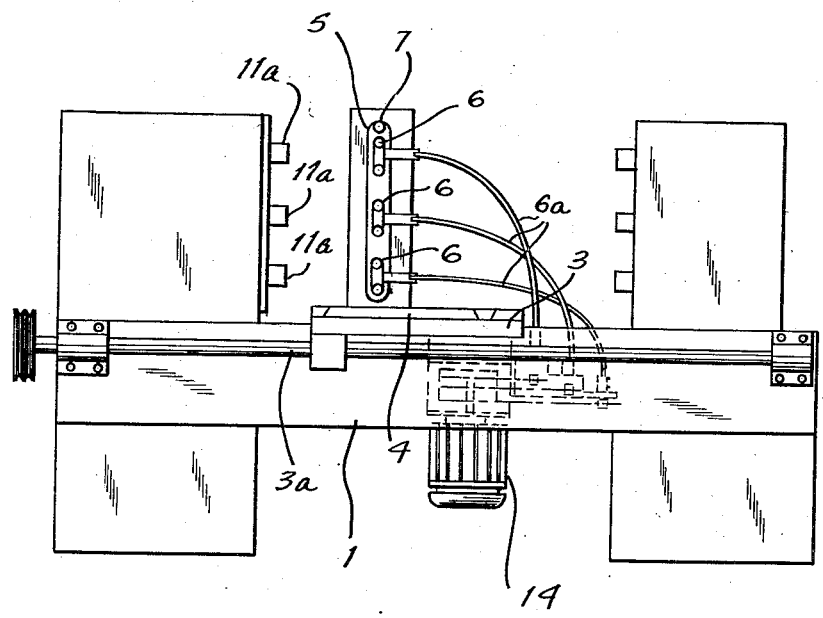

Fig. 4 a front view of the duplicating machine showing the whole arrangement and the drives for the cutting tools.

Referring now to the drawings, it will be seen that the apparatus of the invention includes a support frame having the guides 1 and 2 on which a first carriage 3 is slidably mounted for reciprocating movement in a first predetermined direction, this carriage 3 being moved through the medium of any suitable known structure such as a screw spindle 3a or the like turnably mounted on the support frame and threadedly engaging the carriage 3.

A second carriage 4 is shiftably and adjustably mounted through a dove-tail slot connection on the carriage 3 for reciprocating movement in a second direction perpendicular to the direction in which the carriage 3 moves. The adjusting may be carried out by any suitable known structure such as a screw spindle turnably carried by the carriage 3 and threadedly engaging the carriage 4. This carriage 4 is substantially U-shaped and has upwardly extending opposite walls 10 each of which is formed with a pair of cylindrical openings passing therethrough and located at different elevations, as is evident from Figs. 1 and 3.

A tool carrying means is provided to carry the cutting tools 6 which are adapted to work on the work pieces 11. This tool carrying means includes a substantially C-shaped portion 7 having top and bottom substantially cylindrical legs respectively extending slidably through the openings of the front wall 10 of carriage 4 and a pair of cylindrical rods 9 fixed to the C-shaped portion 7 and respectively extending slidably through the openings of the rear wall of the carriage 4. Also, the tool carrying means includes a tool carrier 5 fixed to the free ends of the top and bottom legs of the C-shaped support 7 and being located on the side of the front wall 10 opposite from the rear wall of the carriage 4. Thus, each of the rods 9 and each of the cylindrical legs of the C-shaped portion 7 constitutes a rod portion, with each rod portion 9 extending through one of the openings in the rear wall of the carriage 4 and with each rod portion 7 extending through one of the openings in the front wall 10 of this carriage. The C-shaped portion 7 and the rods 9 are preferably of a tubular pipe construction so as to keep the weight of the tool carrying means down to a minimum.

A feeler means is associated with the tool carrying means to guide the same for reciprocating movement during the cutting operations, and this feeler means takes the form of a roller 8 digrammatically shown in the drawings and turnably mounted on the C-shaped portion 7 on the rear inner face thereof opposite from the tubular rods 9 and between the top and bottom legs of the C-shaped portion 7. This feeler roller 8 is adapted to contact a model 12 suitably supported on spindles 12a or the like (not shown) so as to be rotated and to engage the roller 8 for reciprocating the tool carrying means which may be resiliently urged toward the model through any suitable means, such as, for example, a pair of coil springs 13 located about the rods 9 between the rear part of C-shaped portion 7 and the rear wall of carriage 4.

The work pieces 11 are also carried and rotated by parallel sets of spindles 11a of head and tail stock assemblies of the machine (Fig. 4) in a manner well known in the art. The cutters 6 which are turnably mounted on the tool carrier 5 are driven in any known way, such as, for example, by means of flexible shaft drives 6a by an electric motor 14.

When the machine operates on fairly small work pieces, as shown in Fig. 1, then the carriage 4 is adjusted to the left toward the work pieces, as viewed in Fig. 1, and the carriage 3 is automatically moved while the cutters 6 are driven to cut the work pieces and the tool carrying means reciprocates on carriage 4 by means of the feeler roller 8 engaging the rotating model 12, the spindle 12a of which being coupled in known way with the spindles 11a.

When work pieces of a larger size are to be operated on, then the carriage 4 is shifted by hand or by means of a screw drive (not shown) to the right to the position shown in Fig. 3, for example, and the remaining operations are identical with those described above.

It is essential that the tool carrying means be mounted on the carriage 4 for reciprocating movement in the same direction that the carriage 4 moves on the carriage 3 since this arrangement provides the shortest possible working stroke even with the greatest differences in the sizes of the work pieces, and it is always the light tool carrying means which moves rather than the entire carriage 4. The light weight of the tool carrying means of the invention permits the model 12 to easily move the tool carrying means and to be free of any large stresses, and, moreover, it guarantees an accurate and sensitive contact between the model 12 and feeler 8 irrespective of the size of the model and work pieces.

It will be understood that each of the elements described above, or two or more together, may also find a useful application in other types of duplicating machines differing from the types described above.

While the invention has been illustrated and described as embodied in supports for cutting tools of duplicating machines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for mounting cutting tools of a duplicating machine, comprising, in combination, a support frame; a first carriage mounted on said support frame for reciprocating movement in a first direction; a second carriage mounted on said first carriage shiftable and adjustable in a second direction perpendicular to said first direction, said second carriage being substantially U-shaped and having a pair of opposite upwardly extending walls each of which is formed with at least one opening passing therethrough; and tool carrying means mounted on said second carriage for reciprocating movement in a third direction parallel to said second direction, said tool carrying means having two rod portions respectively extending through said openings of said walls of said second carriage to guide said tool carrying means for movement in said third direction.

2. Apparatus for mounting cutting tools of a duplicating machine, comprising, in combination, a support frame; a first carriage mounted on said support frame for reciprocating movement in a first direction; a second carriage mounted on said first carriage shiftable and adjustable in a second direction perpendicular to said first direction, said second carriage being substantially U-shaped and having a pair of opposite upwardly extending walls each of which is formed with at least one opening passing therethrough; tool carrying means mounted on said second carriage for reciprocating movement in a third direction parallel to said second direction, said tool carrying means having two rod portions respectively extending through said openings of said walls of said second carriage to guide said tool carrying means for movement in said third direction; and feeler means mounted on said tool carrying means for engaging a model to reciprocate said tool carrying means in accordance with the shape of the model.

3. Apparatus for mounting cutting tools of a duplicating machine, comprising, in combination, a support frame; a first carriage mounted on said support frame for reciprocating movement in a first direction; a second carriage mounted on said first carriage shiftable and adjustable in a second direction perpendicular to said first direction, said second carriage being substantially U-shaped and having a pair of opposite upwardly extending walls each of which is formed with a pair of openings passing therethrough and located at different elevations; tool carrying means mounted on said second carriage for reciprocating movement in a third direction parallel to said second direction, said tool carrying means comprising a substantially C-shaped portion having top and bottom legs respectively extending slidably through said pair of openings of one of said walls and a pair of rods fixed to said C-shaped portion and respectively extending slidably through said pair of openings of the other of said walls, said legs of said C-shaped portion and said rods cooperating with said walls to guide said tool carrying means for movement in said third direction; and feeler means mounted on said tool carrying means for engaging a model to reciprocate said tool carrying means in accordance with the shape of the model, said feeler means being mounted on said C-shaped portion of said tool carrying means between said top and bottom legs thereof and on an inner face of said C-shaped portion on the side thereof opposite from said rods.

4. Apparatus for mounting cutting tools of a duplicating machine, comprising, in combination, a support frame; a first carriage mounted on said support frame for reciprocating movement in a first direction; a second carriage mounted on said first carriage shiftable and adjustable in a second direction perpendicular to said first direction, said second carriage being substantially U-shaped and having a pair of opposite upwardly extending walls each of which is formed with a pair of openings passing therethrough and located at different elevations; tool carrying means mounted on said second carriage for reciprocating movement in a third direction parallel to said second direction, said tool carrying means comprising a substantially C-shaped portion having top and bottom legs respectively extending slidably through said pair of openings of one of said walls and a pair of rods fixed to said C-shaped portion and respectively extending slidably through said pair of openings of the other of said walls, said legs of said C-shaped portion and said rods cooperating with said walls to guide said tool carrying means for movement in said third direction, and said tool carrying means comprising a tool carrier fixed to the free ends of said top and bottom legs of said C-shaped portions and being located on the side of said one wall which is opposite from said other wall; and feeler means mounted on said tool carrying means for engaging a model to reciprocate said tool carrying means in accordance with the shape of the model, said feeler means being mounted on said C-shaped portion of said tool carrying means between said top and bottom legs thereof and on an inner face of said C-shaped portion on the side thereof opposite from said rods.

5. Apparatus for mounting cutting tools of a duplicating machine, comprising, in combination, a support frame; a first carriage mounted on said support frame for reciprocating movement in a first direction; a second carriage mounted on said first carriage shiftable and adjustable in a second direction perpendicular to said first direction, said second carriage being substantially U-shaped and having a pair of opposite upwardly extending walls each of which is formed with a pair of openings passing therethrough and located at different elevations; tool carrying means mounted on said second carriage for reciprocating movement in a third direction parallel to said second direction, said tool carrying means comprising a substantially C-shaped portion having top and bottom legs respectively extending slidably through said pair of openings of one of said walls and a pair of rods fixed to said C-shaped portion and respectively extending slidably through said pair of openings of the other of said walls, said legs of said C-shaped portion and said rods cooperating with said walls to guide said tool carrying means for movement in said third direction, said C-shaped portion and said rods being tubular; and feeler means mounted on said tool carrying means for engaging a model to reciprocate said tool carrying means in accordance with the shape of the model.

References Cited in the file of this patent

UNITED STATES PATENTS

| | | |
|---|---|---|
| 1,195,293 | Townsend | Aug. 22, 1916 |
| 1,883,779 | Gallay | Oct. 18, 1932 |
| 1,997,892 | Wall | Apr. 16, 1935 |
| 2,330,566 | Edmonds et al. | Sept. 28, 1943 |